United States Patent
Du

(10) Patent No.: US 10,679,647 B2
(45) Date of Patent: Jun. 9, 2020

(54) AUDIO RECOGNITION METHOD AND SYSTEM

(71) Applicant: ALIBABA GROUP HOLDING LIMITED, Grand Cayman (KY)

(72) Inventor: Zhijun Du, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 49 days.

(21) Appl. No.: 15/897,431

(22) Filed: Feb. 15, 2018

(65) Prior Publication Data

US 2018/0174599 A1 Jun. 21, 2018

Related U.S. Application Data

(63) Continuation of application No. PCT/CN2016/099053, filed on Sep. 14, 2016.

(30) Foreign Application Priority Data

Sep. 24, 2015 (CN) .......................... 2015 1 0618550

(51) Int. Cl.
*G10L 25/54* (2013.01)
*G10L 25/18* (2013.01)
(Continued)

(52) U.S. Cl.
CPC .............. *G10L 25/54* (2013.01); *G10L 15/02* (2013.01); *G10L 25/18* (2013.01); *G10L 25/21* (2013.01)

(58) Field of Classification Search
CPC ................. G10L 15/02; G10L 25/54
(Continued)

(56) References Cited

U.S. PATENT DOCUMENTS

| 5,361,324 A | 11/1994 | Takizawa et al. |
| 6,990,453 B2 * | 1/2006 | Wang ...................... G10L 17/26 704/270 |

(Continued)

FOREIGN PATENT DOCUMENTS

| CN | 1592906 A | 3/2005 |
| CN | 1647160 A | 7/2005 |

(Continued)

OTHER PUBLICATIONS

PCT International Preliminary Report on Patentability dated Apr. 5, 2018, issued in related International Application No. PCT/CN2016/099053 (11 pages).

(Continued)

*Primary Examiner* — Jakieda R Jackson
(74) *Attorney, Agent, or Firm* — Sheppard Mullin Richter & Hampton LLP

(57) ABSTRACT

An audio recognition method may comprising performing diffusion processing on a plurality of first feature points in a spectrogram of a to-be-recognized audio file to obtain a feature point map; searching in a spectrogram of a target audio file to determine whether the spectrogram of the target audio file comprises second feature points that respectively correspond to the diffused first feature points in the feature point map; and in response to determining that the spectrogram of the target audio file comprises the second feature points, determining that the to-be-recognized audio file is a part of the target audio file.

20 Claims, 7 Drawing Sheets

(51) Int. Cl.
*G10L 15/02* (2006.01)
*G10L 25/21* (2013.01)

(58) Field of Classification Search
USPC .......................... 704/273, 270, 234; 382/154
See application file for complete search history.

(56) References Cited

U.S. PATENT DOCUMENTS

| | | | |
|---|---|---|---|
| 7,627,477 B2* | 12/2009 | Wang | G06K 9/00536 |
| | | | 341/110 |
| 8,586,847 B2 | 11/2013 | Ellis et al. | |
| 8,706,276 B2* | 4/2014 | Ellis | G10L 25/54 |
| | | | 700/94 |
| 8,949,872 B2 | 2/2015 | Slaney et al. | |
| 9,113,203 B2 | 8/2015 | Pora et al. | |
| 9,292,894 B2 | 3/2016 | MacIntosh et al. | |
| 9,461,759 B2 | 10/2016 | Anniballi et al. | |
| 9,661,361 B2 | 5/2017 | Sharifi | |
| 9,743,138 B2 | 8/2017 | Caudell | |
| 9,805,125 B2 | 10/2017 | Oztaskent et al. | |
| 9,838,759 B2 | 12/2017 | Kirmse et al. | |
| 9,894,413 B2 | 2/2018 | Oztaskent et al. | |
| 9,905,233 B1 | 2/2018 | Shivappa et al. | |
| 9,913,056 B2 | 3/2018 | Master et al. | |
| 9,946,769 B2 | 4/2018 | Oztaskent et al. | |
| 10,497,378 B2 | 12/2019 | Wang et al. | |
| 2005/0177372 A1 | 8/2005 | Wang et al. | |
| 2007/0195963 A1 | 8/2007 | Ko et al. | |
| 2009/0205483 A1 | 8/2009 | Kim | |
| 2011/0173208 A1 | 7/2011 | Vogel | |
| 2012/0103166 A1 | 5/2012 | Shibuya et al. | |
| 2012/0296458 A1 | 11/2012 | Koishida et al. | |
| 2014/0111794 A1* | 4/2014 | Yablon | G01M 11/338 |
| | | | 356/73.1 |
| 2014/0219461 A1 | 8/2014 | Liu et al. | |
| 2014/0343704 A1 | 11/2014 | Liu et al. | |
| 2015/0016712 A1* | 1/2015 | Rhoads | G06K 9/00208 |
| | | | 382/154 |
| 2015/0094835 A1* | 4/2015 | Eronen | G06F 3/165 |
| | | | 700/94 |
| 2015/0146989 A1 | 5/2015 | Shiiyama et al. | |
| 2015/0297109 A1* | 10/2015 | Garten | A61B 5/04845 |
| | | | 600/544 |
| 2016/0098993 A1 | 4/2016 | Yamamoto et al. | |
| 2016/0316262 A1 | 10/2016 | Chen | |

FOREIGN PATENT DOCUMENTS

| | | |
|---|---|---|
| CN | 101720048 A | 6/2010 |
| CN | 102568474 A | 7/2012 |
| CN | 103729368 A | 4/2014 |
| CN | 103971676 A | 8/2014 |
| CN | 103971689 A | 8/2014 |
| CN | 103999473 A | 8/2014 |
| CN | 104125509 A | 10/2014 |
| JP | 2969862 B2 | 11/1999 |
| JP | 2012-098360 A | 5/2012 |
| JP | 2015-103088 A | 6/2015 |

OTHER PUBLICATIONS

Extended European Search Report for European Application No. 16848057.2 dated May 7, 2019 (11 pages).
International Search Report and Written Opinion for Application No. PCT/CN2016/099053, dated Dec. 20, 2016, 11 pages.
Communication pursuant to Rule 164(1) EPC and Partial Supplementay European Search Report for European Application No. 16848057.2, dated Feb. 1, 2019 (14 pages).
Joren et al., "Panako—A Scalable Acoustic Fingerprinting System Handling Time-scale and Pitch Modification," 15th International Society for Music Information Retrieval Conference (ISMIR 2014), Oct. 27, 2014, pp. 259-264 (6 pages).
Anguera et al., "MASK: Robust Local Features for Audio Fingerprintig," Multimedia and Expo (ICME), 2012 IEEE International Conference on, IEEE, Jul. 9, 2012, pp. 455-460 (6 pages).
Office Action for Japanese Patent Application No. 2018-515493 dated Mar. 26, 2019 (6 pages).
Takayuki Kurozumi; A Degeneration-Generation Search Method Determining Geometric Transformation Parameters; IEICE Technical Report; Japan; The Institute of Electronics, Information, and Communication Engineers; Dec. 2006; vol. 106 No. 429 (10 pages). English Abstract provided on p. 3 of the document.
Notice to Submit Response for Korean Application No. 10-2018-7008373 dated Jul. 19, 2019 (9 pages).
First Search for Chinese Application No. 201510618550.4 dated Jan. 2, 2020 (1 page).
First Office Action for Chinese Application No. 201510618550.4 dated Jan. 10, 2020 with English machine translation (11 pages).
Examination Report for European Application No. 16848057.2 dated Apr. 2, 2020.
First Examination Report for Indian Application No. 201847006010 dated Mar. 23, 2020.

* cited by examiner

S121: Traversing the spectrogram of the target audio file frame by frame with the feature point map as a window

S122: Determining, in the each traversing process, feature points in the spectrogram of the target audio file inside the window that have coordinates within a range of coordinates of the first feature points in the window after the diffusion processing as the second feature points that respectively correspond to the diffused first feature points

S123: Searching in the spectrogram of the target audio file inside the window to determine whether the second feature points that respectively correspond to the diffused first feature points exist

FIGURE 5

S101: Using feature points comprised in the spectrogram of a to-be-recognized audio file that have energy values or grayscale values greater than a second threshold value as key points
S102: For the each key point having the energy value or grayscale value as a maximum value in a preset region, determining the key point as the first feature point
FIGURE 7
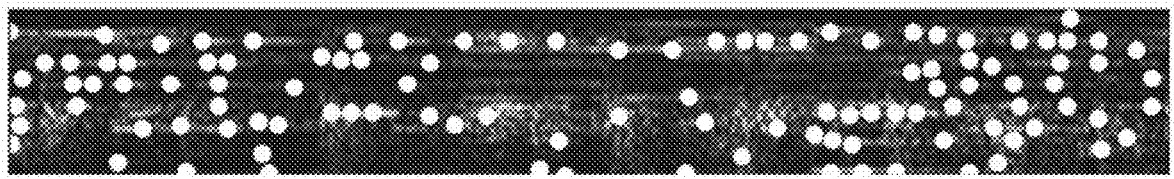
FIGURE 8a
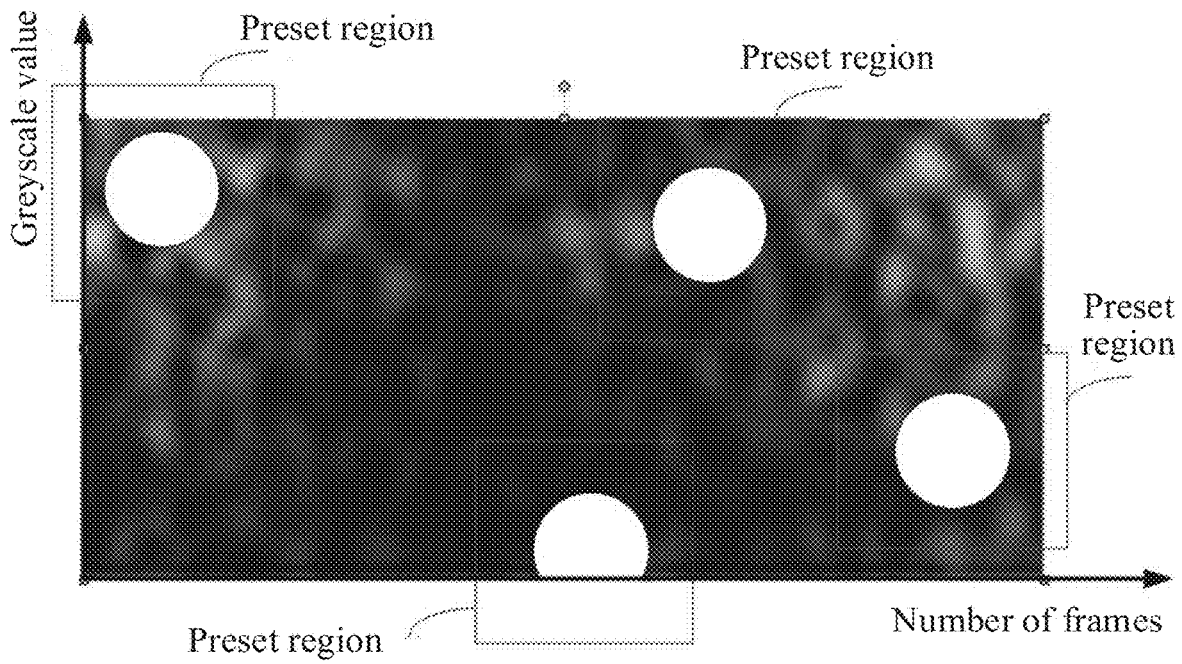
FIGURE 8b

AUDIO RECOGNITION METHOD AND SYSTEM

CROSS-REFERENCE TO RELATED APPLICATIONS

The present application is a continuation application of the International Application No. PCT/CN2016/099053, filed Sep. 14, 2016, which is based on and claims priority to the Chinese Application No. 201510618550.4, filed Sep. 24, 2015. The entire contents of the above referenced applications are incorporated herein by reference.

TECHNICAL FIELD

The present application relates to the field of Internet technologies, and in particular, to an audio recognition method and system.

BACKGROUND

With the continuous development of Internet technologies, the Internet has become an indispensable tool in daily life. A new trend of applications is to achieve recognition of unknown audios by using Internet devices and to perform audio recognition-based interaction.

There are many types of applications for audio recognition-based interaction. For example, one application is that a user hears a song, but does not know the title of the song. A segment of audio of this song can be recorded, and then the title, singer, and other information of this song can be recognized using an audio recognition technology.

According to the prior art, the recognition is typically performed by extracting and using feature points of a to-be-recognized audio. As shown in FIG. 1, the x-axis represents time and the y-axis represents frequency. The extracted feature points are "X" in the figure. Two feature points constitute a feature point pair, and there are eight feature point pairs in the target region. Recognition is performed in a database based on feature point pairs, and the database stores feature points of songs and information of songs, such as song titles, singers, and the like. If the same feature point pairs can be matched in the same target region in the database, the matching is successful; and then corresponding song information can be obtained. Under the inevitable influence by noise during audio recording, however, the extracted feature points may not necessarily occur at normal positions. As a result, the probability of matching success of feature point pairs is relatively low.

In summary, the existing technologies have a deficiency of low matching success rate based on feature points for audio recognition.

SUMMARY

The disclosed audio recognition methods and systems can at least mitigate the described deficiencies of the prior art that cause the low matching success rate of feature points in audio recognition.

According to one aspect, an audio recognition method may comprise performing diffusion processing on a plurality of first feature points in a spectrogram of a to-be-recognized audio file to obtain a feature point map; searching in a spectrogram of a target audio file to determine whether the spectrogram of the target audio file comprises second feature points that respectively correspond to the diffused first feature points in the feature point map; and in response to determining that the spectrogram of the target audio file comprises the second feature points, determining that the to-be-recognized audio file is a part of the target audio file.

According to another aspect, an audio recognition system may comprise a processor and a non-transitory computer-readable storage medium storing instructions that, when executed by the processor, cause the audio recognition system to perform a method. The method may comprise performing diffusion processing on a plurality of first feature points in a spectrogram of a to-be-recognized audio file to obtain a feature point map; searching in a spectrogram of a target audio file to determine whether the spectrogram of the target audio file comprises second feature points that respectively correspond to the diffused first feature points in the feature point map; and in response to determining that the spectrogram of the target audio file comprises the second feature points, determining that the to-be-recognized audio file is a part of the target audio file.

According to another aspect, an audio recognition system comprises: a diffusing unit configured to diffuse first feature points in a spectrogram of a to-be-recognized audio file to obtain a feature point map, wherein there are a plurality of first feature points; a searching unit configured to search in the spectrogram of a target audio file to determine whether second feature points exist that respectively correspond to the diffused first feature points in the feature point map; a determining unit configured to determine that the to-be-recognized audio file is a part of the target audio file when second feature points are found in the spectrogram of the target audio file that respectively correspond to the diffused first feature points in the feature point map.

The disclosed audio recognition methods and systems can reduce deviation errors of first feature points caused by noises, through diffusing the first feature points in a spectrogram of a to-be-recognized audio file. Consequently, the matching rate of first feature points with a target audio file is improved after the diffusion processing, namely the matching success rate of feature points is improved.

BRIEF DESCRIPTION OF THE DRAWINGS

To more clearly describe technical solutions in the embodiments of the present disclosure or the prior art, the accompanying drawings to be used in the description of the embodiments or the prior art will be described briefly as follows. The accompanying drawings in the following description merely illustrate some embodiments recorded in the present disclosure. To a person skilled in the art, other drawings may be further obtained according to these drawings without inventive effort.

FIG. 5 is a method flow chart of steps for S120 in FIG. 2;

FIG. 7 is a flow chart of an audio recognition method according to an embodiment of the present disclosure;

FIG. 8a is a schematic diagram of first feature points determined in a spectrogram;

FIG. 8b is an enlarged partial view of FIG. 8a;

DETAILED DESCRIPTION

To enable a person skilled in the art to better understand the technical solutions in the present disclosure, the technical solutions in the embodiments of the present disclosure will be clearly and completely described below with reference to the accompanying drawings in the embodiments of the present disclosure. Apparently, the described embodiments are merely some, rather than all, of the embodiments of the present disclosure. All other embodiments obtainable by a person skilled in the art on the basis of the embodiments of the present disclosure and without inventive effort shall fall within the scope of the present disclosure.

Figure 1:
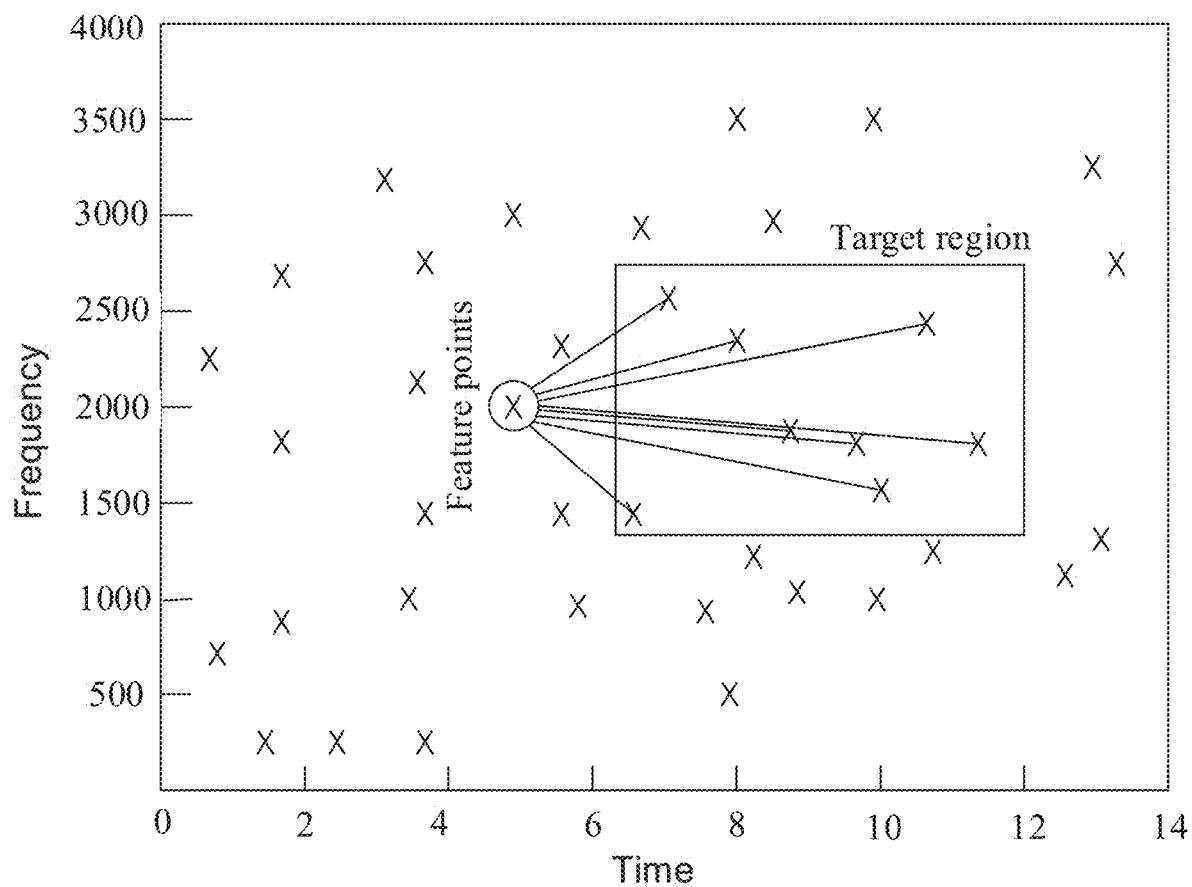
FIG. 1 is a schematic diagram of performing recognition with feature point pairs according to the prior art.
Figure 2:
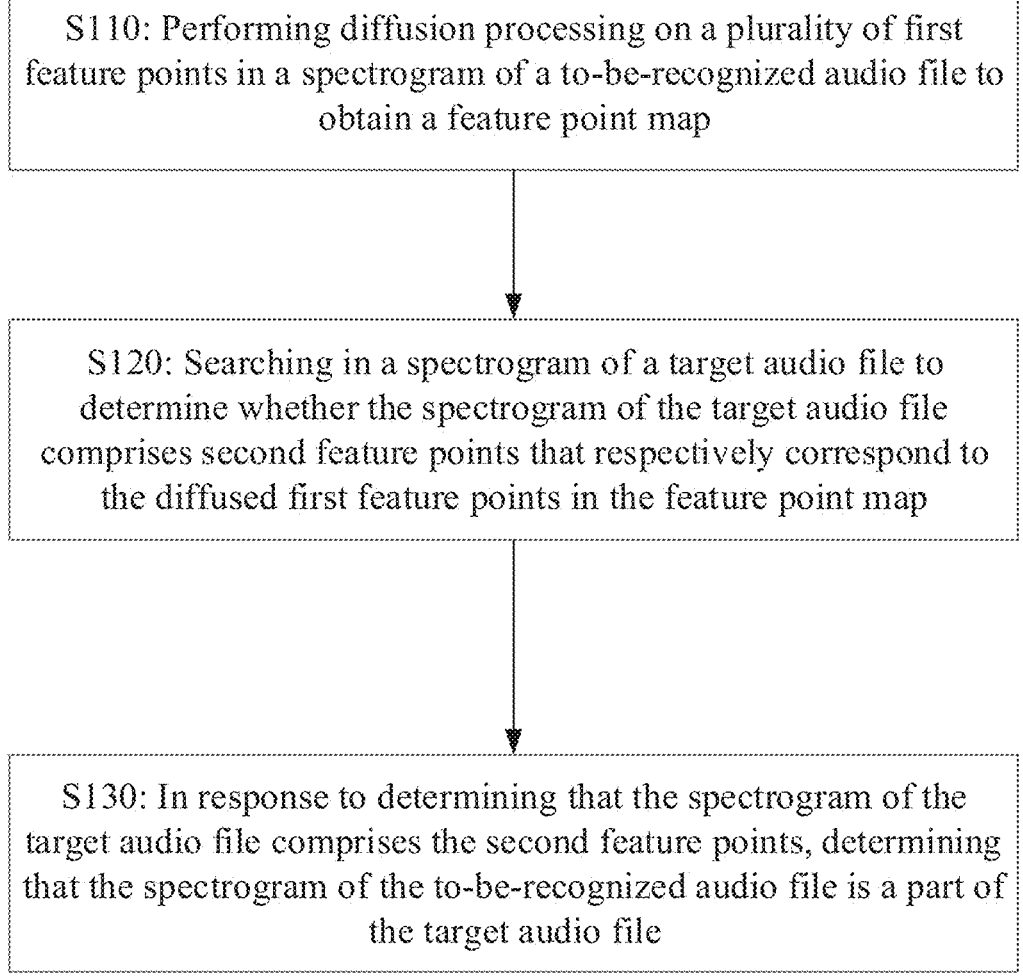
FIG. 2 is a flow chart of an audio recognition method according to an embodiment of the present disclosure.

FIG. 2 is a flow chart of an audio recognition method according to an embodiment of the present disclosure. In some embodiments, the audio recognition method comprises the following steps:

S110: performing diffusion processing on a plurality of first feature points in a spectrogram of a to-be-recognized audio file to obtain a feature point map.

The spectrogram is also referred to as an audio spectrogram, which is usually obtained by processing received temporal signals. Typically, the x-axis of a spectrogram is used to represent time, the y-axis is used to represent frequency, and values of coordinate points represent audio data energy. A 2-dimensional plane can usually be used to express 3-dimensional information. Therefore, colors can be used to represent the magnitude of energy values of audio data represented by the values of coordinate points. For example, a spectrum of color may be used. When the color becomes darker, it indicates that the audio energy of a coordinate point is stronger; conversely, a coordinate point having a lighter color can indicate that the audio energy of the coordinate point is weaker. Moreover, a grayscale may be used. When a coordinate point has a color closer to white, it indicates that the audio energy of the coordinate point is stronger; conversely, a coordinate point having a color closer to black can indicate that the audio energy of the coordinate point is weaker.

As such, a spectrogram can intuitively represent spectral characteristics of audio signals that vary with time. The intensity of any particular frequency component at a given moment can be represented by a degree of grayscale or tone of a corresponding point.

For example, a spectrogram can be obtained through the following steps:

A1: dividing a to-be-recognized audio file into frames according to a preset time.

The preset time may be an empirical value obtained by a user according to the past experience. In some embodiments, the preset time includes 32 ms. Namely, the to-be-recognized audio file can be divided into frames according to 32 ms to obtain audio segments of 32 ms each frame and 16 ms frame overlap.

A2: performing short-time spectral analysis on the audio segments after the frame division processing to obtain a spectrogram.

The short-time spectral analysis includes Fast Fourier Transformation (FFT). FFT is a fast algorithm of Discrete Fourier Transformation, and FFT can be used to transform audio signals to a spectrogram that records joint distribution information in time domain and frequency domain.

Since frames are divided at 32 ms and 32 ms corresponds to an 8,000 hz sampling, 256 frequency points can be obtained after the FFT calculation.

Figure 3:
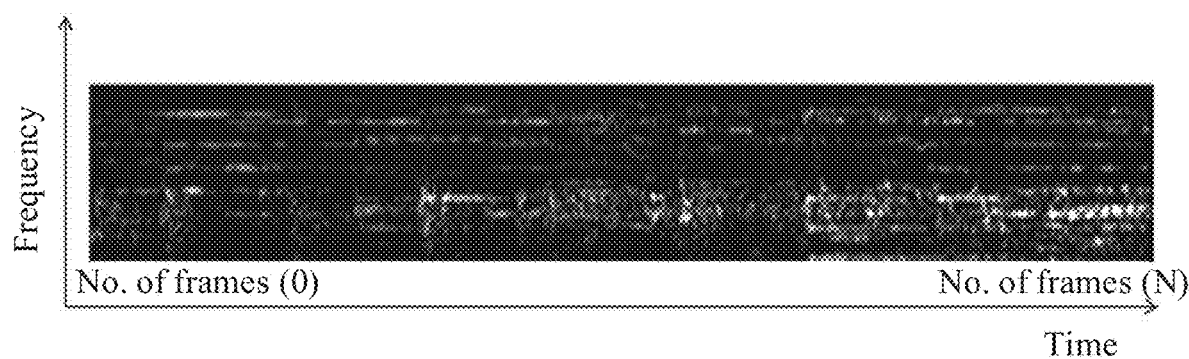
FIG. 3 is a schematic diagram of a spectrogram of a to-be-recognized audio file.

As shown in FIG. 3, the x-axis can represent a number of frames, namely the number of frames of an audio file after the frame division processing, which corresponds to the width of a spectrogram; the y-axis can represent frequency, and there are a total of 256 frequency points, which correspond to the height of the spectrogram; and the values of coordinate points represent energy of first feature points.

In some embodiments, after performing short-time spectral analysis on the audio segments after the frame division processing, the method may further comprise:

A3: extracting a frequency segment of 300-2 k hz after the short-time spectral analysis.

As regular songs have main frequencies clustered in the frequency segment of 300-2 k hz, the present step can eliminate the negative impact of noises from other frequency segments by extracting the frequency segment of 300-2 k hz.

In some embodiments, before the step S110, the method may further comprise: normalizing energy values of first feature points in a spectrogram of a to-be-recognized audio file to grayscale values of the first feature points.

In some embodiments, the range of energy values of the first feature points after FFT is relatively broad, which may reach $0-2^8$ or even $0-2^{16}$ (the range of energy values is proportional to the signal intensity of the audio file). As a result, the energy values are normalized into a range of 0-255 herein, such that 0-255 may correspond to grayscale values with 0 representing black and 255 representing white.

An exemplary normalizing method comprises: traversing energy values of first feature points in the entire spectrogram to obtain a maximum value and a minimum value;

Normalizing the first feature points:

$$v = 255 \cdot \frac{(v - v_{min})}{(v_{max} - v_{min})} \quad (2)$$

Wherein V is energy value of a first feature point, $V_{min}$ is the minimum value, and $V_{max}$ is the maximum value.

Embodiments of the present application may adopt the above normalizing method. However, $V_{min}$ obtained with such a normalizing method could be too low when some weak sounds are present. For example, it is possible that $V_{min}$ approaches 0 such that the normalization equation becomes $$v = 255 \cdot \frac{v}{v_{max}}.$$

As such, the equation is independent from $V_{min}$. As such, the $V_{min}$ becomes unrepresentative and impacts the overall normalizing results.

Embodiments of the present disclosure provide a new normalizing method which may comprise: traversing a spectrogram of the to-be-recognized audio file frame by frame with a first preset length as a window; acquiring a local maximum value and a local minimum value among energy values of first feature points within the window; and normalizing, according to the local maximum value and the local minimum value, the energy values of the first feature points to grayscale values of the first feature points.

The equation shown in (2) is used, wherein V is the energy value of a first feature point, $V_{min}$ is the local minimum value, and $V_{max}$ is the local maximum value.

In some embodiments, the first preset length may comprise T frames preceding the current frame and T frames following the current frame. Namely, the first preset length is 2 T frames, and 2 T+1 frames are greater than 1 s.

With the normalizing method described, some weak sounds can only impact normalization results within the first preset length in which they are located, but cannot impact normalization results beyond the first preset length. Therefore, this normalizing method can reduce the impact of weak sounds on the overall normalizing results.

The diffusion processing may comprise Gauss function diffusion processing. Namely, the Gauss function is used for diffusion processing on first feature points. The diffusion processing may further comprise amplification processing. Namely, the first feature points are amplified by several times, for example, amplified by 10 times.

Gauss function diffusion processing is described as an example below, which uses the following equation:

$$f(x) = ae^{-(x-b)^2/c^2} \quad (1)$$

Wherein a, b, and c are constants, and a>0.

Namely, the equation (1) is used to perform Gauss function diffusion processing on the radius or diameter of a first feature point.

Amplification processing of a first feature point is used as an example below, in which the radius or diameter of the first feature point is amplified, for example, the radius or diameter is amplified by 10 times. In some embodiments, the first feature point may be amplified by several times and then become at least one of a circle, a rhombus, a rectangle, or etc.

Figure 4A:
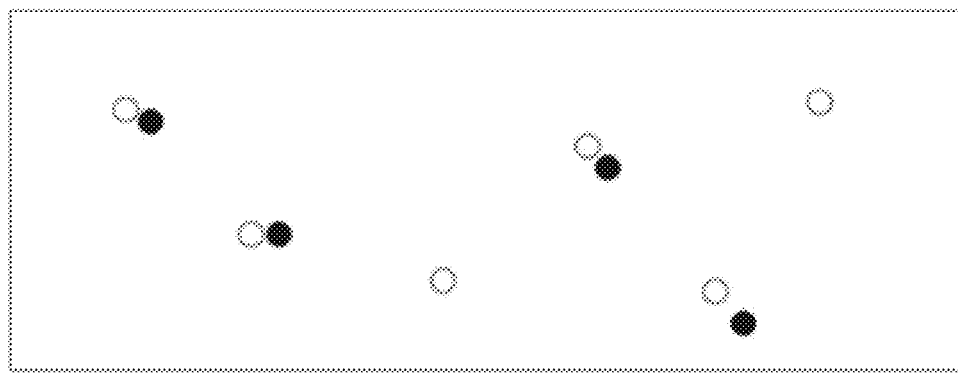
FIG. 4a is a schematic diagram of first feature points before diffusion processing.
Figure 4B:
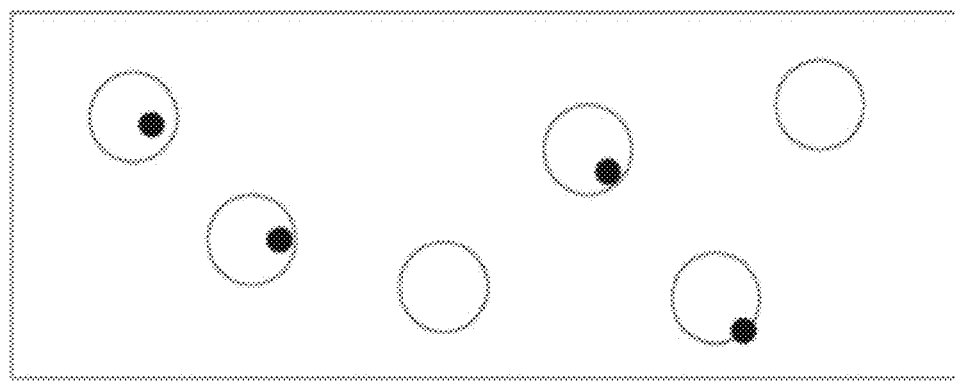
FIG. 4b is a schematic diagram of the first feature points after the diffusion processing.

As shown in FIG. 4a, white dots (first feature points of a to-be-recognized audio file) and black dots (feature points of a target audio file) are not at the same locations before the diffusion processing, and as a result, there are not many second feature points ultimately obtained through matching. As shown in FIG. 4b, the white dots are diffused from individual dotted areas into regions after the diffusion processing, and all the regions overlap with the black dots.

The diffusion processing can cause a first feature point to diffuse from a dot into a region, and then can have some resistance against interference by noises. For example, due to the interference by noises, the first feature points of a recorded audio may slightly differ from the positions of the first feature points of the original audio. A such difference can be negligible in the diffusion processing, and the number of second feature points obtained through matching is increased.

S120: searching in a spectrogram of a target audio file to determine whether the spectrogram of the target audio file comprises second feature points that respectively correspond to the diffused first feature points in the feature point map exist.

As shown in FIG. 5, the step S120 may comprise:

S121: traversing the spectrogram of the target audio file frame by frame with the feature point map as a window;

S122: determining, in the each traversing process, feature points in the spectrogram of the target audio file inside the window that have coordinates within a range of coordinates of the first feature points in the window after the diffusion processing as the second feature points that respectively correspond to the diffused first feature points;

S123: searching in the spectrogram of the target audio file inside the window to determine whether the second feature points that respectively correspond to the diffused first feature points exist.

Figure 6:
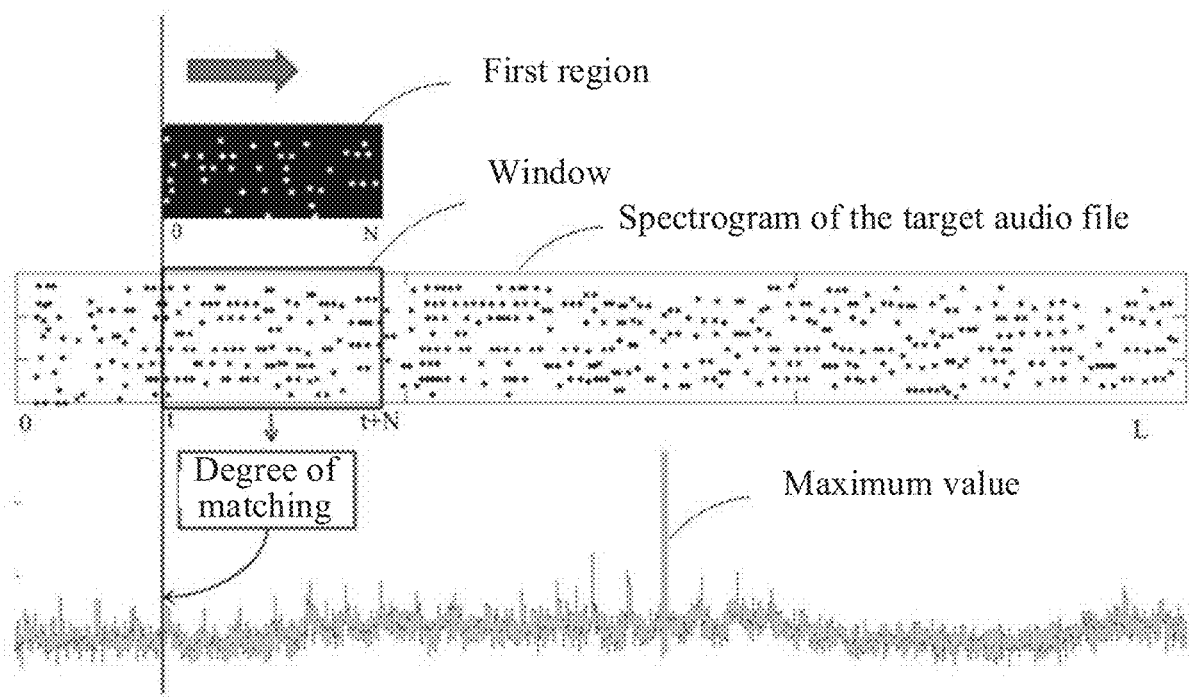
FIG. 6 is a schematic diagram of searching in a spectrogram of a target audio file for second feature points that respectively correspond to the diffused first feature points in a feature point map.

FIG. 6 is a schematic diagram of searching in a spectrogram of a target audio file for second feature points that respectively correspond to the diffused first feature points in a feature point map. Assuming that the number of frames of the feature point map is N, the number of frames of the spectrogram of the target audio file is L, and the L is greater than or equal to N. First, a region with the number of frames being [0, N] in the spectrogram of the target audio file is searched; subsequently, a region of [1, N+1] is searched; such frame by frame search is performed until the region of [L−N, L] is traversed. In the each traversing process, t in the window of [t, t+N] of each frame is the number of frames, and feature points in the spectrogram of the target audio file that have coordinates within a range of coordinates of the first feature points after the diffusion processing are determined as second feature points. Search is performed in the target audio file for second feature points that respectively correspond to the diffused first feature points.

In some embodiments, all audio files in a database may be traversed. As such, audio information of a to-be-recognized audio file can be more accurately recognized.

S130: if yes (that is, in response to determining that the spectrogram of the target audio file comprises the second feature points that respectively correspond to the diffused first feature points in the feature point map), determining that the spectrogram of the to-be-recognized audio file is a part of the target audio file.

If second feature points that respectively correspond to the diffused first feature points are found in the spectrogram of the to-be-recognized audio file, it can be determined that the to-be-recognized audio file is a part of the target audio file.

By performing the diffusion processing on first feature points in a spectrogram of a to-be-recognized audio file, the deviation of the first feature points caused by noise can be reduced; consequently, the matching rate of first feature points with a target audio file is improved after the diffusion processing, namely the matching success rate of feature points is improved.

In one embodiment of the present disclosure, the step S122 may comprise: determining a degree of matching between first feature points and feature points in the spectrogram of the target audio file inside the window that have coordinates within a range of coordinates of the first feature points in the window after the diffusion processing; and determining feature points with the degree of matching greater than a first threshold value as second feature points.

The degree of matching comprises a ratio of the number of feature points in the spectrogram inside the window that are within a range of coordinates of the diffused first feature points to the number of the first feature points, or a sum of energy values or grayscale values of the first feature points corresponding to the feature points in the spectrogram inside the window that are within a range of coordinates of the diffused first feature points. The first threshold value may be a statistical result by a user according to comprehensive relevant factors.

With the ratio of the number of feature points in the spectrogram inside the window that are within a range of coordinates of the diffused first feature points to the number of the first feature points as an example, if the number of the diffused first feature points is 100 and the number of the feature points is 60, the degree of matching between the first feature points and the feature points is 60%. If the first threshold value is 80%, the feature points are determined not to be the second feature points.

With a sum of energy values of the first feature points corresponding to the feature points in the spectrogram inside the window that are within a range of coordinates of the diffused first feature points as an example, if the number of the feature points is 10, the energy values of the 10 first feature points corresponding to these 10 feature points are added to obtain a sum of energy values. If the sum of energy values is greater than the first threshold value, the feature points are determined to be the second feature points.

With a sum of grayscale values of the first feature points corresponding to the feature points in the spectrogram inside the window that are within a range of coordinates of the diffused first feature points as an example, if the number of the feature points is 10, the grayscale values of the 10 first feature points corresponding to these 10 feature points are added to obtain a sum of grayscale values. If the sum of grayscale values is greater than the first threshold value, the feature points are determined to be the second feature points.

In one embodiment of the present disclosure, before the step S110, the method may further comprise S101 and S102, as shown in FIG. 7:

S101: using feature points comprised in the spectrogram of a to-be-recognized audio file that have energy values or grayscale values greater than a second threshold value as key points.

The second threshold value may be a statistical result by a user according to comprehensive relevant factors. The smaller the second threshold value is, the more key points can be extracted, which may then lead to a longer subsequent matching time. The greater the second threshold value is, the fewer key points can be extracted, which may then lead to an overly low probability of subsequent matching success.

S102: for the each key point having the energy value or grayscale value as a maximum value in a preset region, determining the key point as the first feature point.

The preset region may be a circular region with the key point as the center and determined according to a preset radius; or a rectangular region with the key point as the center and determined according to a preset length and width.

The preset region may be a statistical result by a user according to comprehensive relevant factors. The smaller the preset region is, the more first feature points can be determined, which may then lead to a longer subsequent matching time. The larger the preset region is, the fewer first feature points can be determined, which may then lead to an overly low probability of subsequent matching success.

FIG. 8a is a schematic diagram of first feature points determined in a spectrogram. White dots in the figure are first feature points. For example, it is assumed that the second threshold value is 30 and the preset region is 15*15 (with the key point as the center, 15 frames are obtained on the x-axis and a length of 15 is obtained on the y-axis), and FIG. 8b is an enlarged partial view of FIG. 8a. When the energy value or grayscale value of a white dot in the figure is greater than the second threshold value of 30 and is still the maximum value in the preset region of 15*15, such a dot is extracted as a first feature point.

In one example, feature points with high energy values or grayscale values in a spectrogram are extracted as first feature points, which can eliminate the interference by feature points with low energy on subsequent matching and can greatly reduce the amount of data for the diffusion processing, thereby improving the system performance.

In one embodiment of the present disclosure, the target audio file can carry audio information. When the present disclosure is applied in a song recognition scenario, the audio information may include song names. A user records a to-be-recognized audio file with unknown song names or a to-be-recognized audio file that is a song with an unknown song name. When it is determined that the to-be-recognized audio file is a part of a target audio file, the song name of the to-be-recognized audio file can be recognized.

Figure 9:
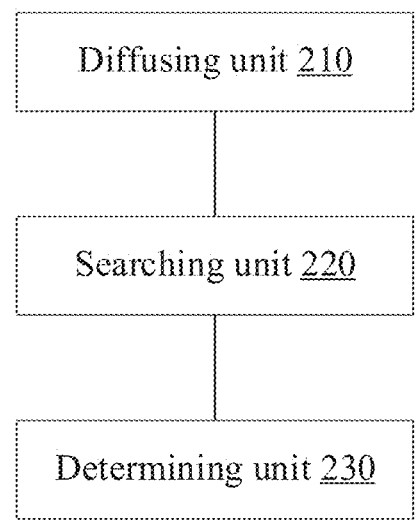
FIG. 9 is a schematic diagram of modules of an audio recognition system according to an embodiment of the present disclosure.

FIG. 9 is a schematic diagram of modules of an audio recognition system according to an embodiment of the present disclosure. In some embodiments, the audio recognition system comprises: a diffusing unit 210 configured to diffuse first feature points in a spectrogram of a to-be-recognized audio file to obtain a feature point map, wherein there are a plurality of first feature points; a searching unit 220 configured to search in the spectrogram of a target audio file to determine whether second feature points exist that respectively correspond to the diffused first feature points in the feature point map; a determining unit 230 configured to determine that the to-be-recognized audio file is a part of the target audio file when a region in which second feature points respectively correspond to the diffused first feature points in the feature point map is found in the spectrogram of the target audio file. The audio recognition system according to the various embodiments (e.g., an audio recognition system comprising a processor and a memory coupled together) may be implemented in a software manner, or may be implemented in a hardware manner, which is not limited herein. In other words, the units 210, 220, and 230 can be software functional units stored in the memory (e.g., stored as instructions in a non-transitory computer readable storage medium). When the software functional units are executed by the processor, they cause the audio recognition system (e.g., the processor) to perform the described functions (e.g., the steps and methods disclosed herein). The units 210, 220, and 230 may also be hardware units, such as, programmed circuitry for performing the described functions.

In some embodiments, before the diffusing unit 210, the audio recognition system may further comprise: a normalizing unit configured to normalize energy values of first feature points in a spectrogram of a to-be-recognized audio file to grayscale values of the first feature points.

In some embodiments, the diffusing processing comprises at least one of Gauss function diffusion processing or amplification processing.

In some embodiments, the normalizing unit may comprise: a first normalizing sub-unit configured to traverse a spectrogram of the to-be-recognized audio file frame by frame with a first preset length as a window; a second normalizing sub-unit configured to acquire a local maximum value and a local minimum value among energy values of first feature points within the window; and a third normalizing sub-unit configured to normalize, according to the local maximum value and the local minimum value, the energy values of first feature points to grayscale values of the first feature points.

In some embodiments, the searching unit 220 may comprise: a first searching sub-unit configured to traverse the spectrogram of the target audio file frame by frame with the feature point map as a window; a second searching sub-unit configured to determine, in each traversing process, feature points in the spectrogram of the target audio file inside the window that have coordinates within a range of coordinates of the first feature points in the window after the diffusion processing as second feature points; and a third searching sub-unit configured to search in the spectrogram of the target audio file inside the window to determine whether second feature points exist that respectively correspond to the diffused first feature points.

In some embodiments, the second searching sub-unit may comprise: a fourth searching sub-unit configured to determine a degree of matching between the first feature points and feature points in the spectrogram of the target audio file inside the window that have coordinates within a range of coordinates of the first feature points in the window after the diffusion processing; and a fifth searching sub-unit configured to determine feature points with the degree of matching greater than a first threshold value as second feature points.

In some embodiments, the degree of matching comprises a ratio of the number of feature points in the spectrogram inside the window that are within a range of coordinates of the diffused first feature points to the number of the first feature points, or a sum of energy values or grayscale values of the first feature points corresponding to the feature points in the spectrogram inside the window that are within a range of coordinates of the diffused first feature points.

In some embodiments, before the diffusion processing, the audio recognition system may further comprise: a first processing unit configured to use feature points comprised in the spectrogram of a to-be-recognized audio file that have energy values or grayscale values greater than a second threshold value as key points; and a second processing unit configured to determine, if the energy value or grayscale value of the key point is the maximum value in a preset region, the key point as a first feature point.

In some embodiments, the target audio file carries audio information, and the audio information includes song names.

In the 1990s, an improvement to a technology could be clearly differentiated into a hardware improvement (e.g. an improvement to a circuit structure, such as a diode, a transistor, a switch, and the like) or a software improvement (an improvement to a flow of a method). Along with the technological development, however, many current improvements to method flows can be deemed as direct improvements to hardware circuit structures. Designers usually obtain a corresponding hardware circuit structure by programming an improved method flow into a hardware circuit. Therefore, an improvement to a method flow can be realized with implementing a hardware module. For example, Programmable Logic Device (PLD) (e.g. Field Programmable Gate Array (FPGA)) is such an integrated circuit that its logic functions are determined by a user through programming the device. A designer can program to "integrate" a digital system onto one piece of PLD, without asking a chip manufacturer to design and manufacture a dedicated IC chip. At present, moreover, this type of programming has mostly been implemented through "logic compiler" software, rather than manually manufacturing the IC chips. The logic compiler software is similar to a software compiler used for program development and writing, while a particular programming language is used for writing source codes prior to compiling, which is referred to as a Hardware Description Language (HDL). There is not just one, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language) and the like. The most commonly used HDL currently includes VHDL (Very-High-Speed Integrated Circuit Hardware Description Language) and Verilog. A person skilled in the art would have known obtaining a hardware circuit to implement a logic method flow by using the above HDLs to perform some logic programming on the method flow and program it into an IC.

A controller may be implemented in any proper manner. For example, a controller may be in a form of a microprocessor or processor, as well as a computer readable medium that stores computer readable program codes (e.g. software or firmware) executable by the (micro)processor, a logic gate, a switch, an Application Specific Integrated Circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. A memory controller may further be implemented as a part of a control logic of a memory. A person skilled in the art should also be aware that, in addition to that a controller is implemented in a manner of pure computer readable program codes, it is feasible to perform logic programming on steps of a method to enable a controller to implement the same functions in a form of a logic gate, a switch, an ASIC, a programmable logic controller and an embedded microcontroller. Therefore, such a controller can be deemed as a hardware part, while devices comprised therein and configured to carry out various functions may also be deemed as a structure inside the hardware part. Alternatively, devices configured to carry out various functions may even be deemed as both software modules to implement a method and a structure inside a hardware part.

The system, apparatus, module or unit described in the above embodiments may be implemented by a computer chip or entity or implemented by a product having a function.

For convenience of description, the above apparatus is divided into various units according to functions for separate description. Functions of the units may be implemented in one or multiple pieces of software and/or hardware when implementing the present disclosure.

A person skilled in the art should understand that the embodiments of the present disclosure may be provided as a method, a system, or a computer program product. Therefore, the disclosed system may be implemented as a complete hardware embodiment, a complete software embodiment, or an embodiment combining software and hardware. Moreover, the disclosed system may be implemented in the form of a computer program product implemented on one or more computer usable storage media (including, but not limited to, a magnetic disk memory, CD-ROM, an optical memory, and the like) comprising computer usable program codes therein.

The disclosed system is described with reference to flowcharts and/or block diagrams of the method, device (system) and computer program product according to the embodiments of the present disclosure. It should be understood that a computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, such that the instructions executed by a computer or a processor of other programmable data processing devices generate an apparatus for implementing a specified function in one or more processes in the flowcharts and/or in one or more blocks in the block diagrams.

These computer program instructions may also be stored in a computer readable memory that can instruct a computer or other programmable data processing devices to work in a particular manner, such that the instructions stored in the computer readable memory generate a manufactured article that includes an instruction apparatus. The instruction apparatus implements a specified function in one or more processes in the flowcharts and/or in one or more blocks in the block diagrams.

These computer program instructions may also be loaded onto a computer or other programmable data processing devices, such that a series of operational steps are performed on the computer or other programmable devices, thereby generating computer-implemented processing. Therefore, the instructions executed on the computer or other programmable devices provide steps for implementing a specified function in one or more processes in the flowcharts and/or in one or more blocks in the block diagrams.

In a typical configuration, the computation device includes one or more Central Processing Units (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

It should be further noted that the terms of "including", "comprising" or any other variants thereof intend to encompass a non-exclusive inclusion, such that a process, method, commodity or device comprising a series of elements not only comprises these elements, but also comprises other elements that are not listed, or further comprises elements that are inherent to the process, method, commodity or device. When there is no further restriction, elements defined by the statement "comprising one . . . " does not exclude additional similar elements in a process, method, commodity, or device that comprises the defined elements.

A person skilled in the art should understand that the embodiments of the present disclosure may be provided as a method, a system, or a computer program product. Therefore, the present disclosure may be implemented as a complete hardware embodiment, a complete software embodiment, or an embodiment combining software and hardware. Moreover, the present disclosure may be in the form of a computer program product implemented on one or more computer usable storage media (including, but not limited to, a magnetic disk memory, CD-ROM, an optical memory, and the like) comprising computer usable program codes therein.

The present disclosure may be described in a regular context of a computer executable instruction that is executed by a computer, such as a program module. In various embodiments, the program module comprises a routine, a program, an object, a component, a data structure, and the like for executing a particular task or implementing a particular abstract data type. The present disclosure may also be practiced in distributed computing environments. In these distributed computing environments, remote processing devices connected via communication networks carry out tasks. In the distributed computing environments, a program module can be located in local and remote computer storage media, including storage devices.

The embodiments in this description are described in a progressive manner with each embodiment focusing on differences from other embodiments, and the embodiments may be mutually referenced for identical or similar parts thereof. For the system embodiment, the description thereof is relatively simple as it is substantially similar to the method embodiment. The description of the method embodiment may be referenced for related parts thereof.

The embodiments of the present disclosure described above are merely exemplary, and are not used to limit the present disclosure. To a person skilled in the art, the disclosed embodiments may be modified or changed in various ways. Any modification, equivalent substitution or improvement made within the spirit and principle of the present disclosure shall fall within the scope of the claims of the present disclosure.

What is claimed is:

1. An audio recognition method, comprising:
   performing diffusion processing on a plurality of first feature points in a spectrogram of a to-be-recognized audio file to obtain a feature point map;
   traversing a spectrogram of a target audio file frame-by-frame with the feature point map as a window;
   determining, during each frame-by-frame traversal, whether feature points in the spectrogram of the target audio file inside the window having coordinates within a range of coordinates of the diffusion processed first feature points;
   if a feature point in the spectrogram of the target audio file inside the window has coordinates within a range of coordinates of a diffusion processed first feature point, determining that the feature point matches the diffusion processed first feature point;
   determining a degree of matching between the diffusion processed first feature points and the feature points in the spectrogram of the target audio file in the window; and
   in response to determining that the degree of matching exceeds a first threshold value, determining that the to-be-recognized audio file is a part of the target audio file.

2. The method according to claim 1, further comprising, before the step of performing diffusion processing on a plurality of first feature points in a spectrogram of a to-be-recognized audio file:
   normalizing energy values of the first feature points in the spectrogram of the to-be-recognized audio file to gray-scale values of the first feature points.

3. The method according to claim 2, wherein the step of normalizing energy values of the first feature points in the spectrogram of the to-be-recognized audio file to the grayscale values of the first feature points comprises:
acquiring a local maximum value and a local minimum value among the energy values of the first feature points within the window; and
normalizing, according to the local maximum value and the local minimum value, the energy values of the first feature points to grayscale values of the first feature points.

4. The method according to claim 1, wherein the diffusion processing comprises at least one of Gauss function diffusion processing or amplification processing.

5. The method according to claim 1, wherein the degree of matching comprises a ratio of a number of the feature points in the spectrogram inside the window that match the diffusion processed first feature points to a number of the first feature points.

6. The method according to claim 1, wherein the degree of matching comprises a sum of energy values or grayscale values of the feature points in the spectrogram inside the window that match the diffusion processed first feature points.

7. The method according to claim 1, wherein, before the step of performing diffusion processing on first feature points in a spectrogram of a to-be-recognized audio file, the method further comprises:
using feature points comprised in the spectrogram of the to-be-recognized audio file that have energy values or grayscale values greater than a second threshold value as key points; and
for each of the key points having a maximum energy value or a maximum grayscale value in a preset region, determining the each of the key points as a first feature point of the first feature points.

8. The method according to claim 1, wherein the target audio file carries audio information, and the audio information includes song names.

9. An audio recognition system, comprising a processor and a non-transitory computer-readable storage medium storing instructions that, when executed by the processor, cause the audio recognition system to perform a method, the method comprising:
performing diffusion processing on a plurality of first feature points in a spectrogram of a to-be-recognized audio file to obtain a feature point map;
traversing a spectrogram of a target audio file frame-by-frame with the feature point map as a window;
determining, during each frame-by-frame traversal, whether feature points in the spectrogram of the target audio file inside the window having coordinates within a range of coordinates of the diffusion processed first feature points;
if a feature point in the spectrogram of the target audio file inside the window has coordinates within a range of coordinates of a diffusion processed first feature point, determining that the feature point matches the diffusion processed first feature point;
determining a degree of matching between the diffusion processed first feature points and the feature points in the spectrogram of the target audio file in the window; and
in response to determining that the degree of matching exceeds a first threshold value, determining that the to-be-recognized audio file is a part of the target audio file.

10. The system according to claim 9, further comprising, before the step of performing diffusion processing on a plurality of first feature points in a spectrogram of a to-be-recognized audio file:
normalizing energy values of the first feature points in the spectrogram of the to-be-recognized audio file to grayscale values of the first feature points.

11. The system according to claim 10, wherein the step of normalizing energy values of the first feature points in the spectrogram of the to-be-recognized audio file to the grayscale values of the first feature points comprises:
acquiring a local maximum value and a local minimum value among the energy values of the first feature points within the window; and
normalizing, according to the local maximum value and the local minimum value, the energy values of the first feature points to grayscale values of the first feature points.

12. The system according to claim 9, wherein the diffusion processing comprises at least one of Gauss function diffusion processing or amplification processing.

13. The system according to claim 9, wherein the degree of matching comprises a ratio of a number of feature points in the spectrogram inside the window that match the diffusion processed first feature points to a number of the first feature points.

14. The system according to claim 9, wherein the degree of matching comprises a sum of energy values or grayscale values of the feature points in the spectrogram inside the window that match the diffusion processed first feature points.

15. The system according to claim 9, wherein, before the step of performing diffusion processing on first feature points in a spectrogram of a to-be-recognized audio file, the method further comprises:
using feature points comprised in the spectrogram of the to-be-recognized audio file that have energy values or grayscale values greater than a second threshold value as key points; and
for each of the key points having a maximum energy value or a maximum grayscale value in a preset region, determining the each of the key points as a first feature point of the first feature points.

16. The system according to claim 9, wherein the target audio file carries audio information, and the audio information includes song names.

17. An audio recognition method, comprising:
normalizing energy values of first feature points in a spectrogram of a to-be-recognized audio file to grayscale values of the first feature points, the normalizing comprising:
traversing the spectrogram of the to-be-recognized audio file frame-by-frame with a first preset length as a window;
acquiring a local maximum value and a local minimum value among the energy values of the first feature points within the window; and
normalizing, according to the local maximum value and the local minimum value, the energy values of the first feature points to grayscale values of the first feature points;
performing diffusion processing on the normalized first feature points in a spectrogram of a to-be-recognized audio file to obtain a feature point map;
searching in the spectrogram of a target audio file to determine whether the spectrogram of the target audio file comprises second feature points that respectively correspond to the diffusion processed and normalized first feature points in the feature point map; and in response to determining that the spectrogram of the target audio file comprises the second feature points, determining that the to-be-recognized audio file is a part of the target audio file.

18. The method according to claim 17, wherein the diffusion processing comprises at least one of Gauss function diffusion processing or amplification processing.

19. The method according to claim 17, further comprising, before the step of performing diffusion processing on the normalized first feature points in the spectrogram of the to-be-recognized audio file:

using feature points comprised in the spectrogram of the to-be-recognized audio file that have energy values or grayscale values greater than a second threshold value as key points; and for each of the key points having a maximum energy value or a maximum grayscale value in a preset region, determining the each of the key points as a first feature point of the first feature points.

20. The method according to claim 17, wherein the target audio file carries audio information, and the audio information includes song names.

* * * * *